US009340371B2

(12) United States Patent
Mishler

(10) Patent No.: US 9,340,371 B2
(45) Date of Patent: May 17, 2016

(54) SERVO ROTARY SHINGLE DIVERTER AND METHOD

(71) Applicant: Building Materials Investment Corporation, Dallas, TX (US)

(72) Inventor: Patrick C. Mishler, Dundalk, MD (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

(21) Appl. No.: 14/586,146

(22) Filed: Dec. 30, 2014

(65) Prior Publication Data

US 2015/0183591 A1    Jul. 2, 2015

Related U.S. Application Data

(60) Provisional application No. 61/922,189, filed on Dec. 31, 2013.

(51) Int. Cl.
| B65G 47/46 | (2006.01) |
| B65G 47/82 | (2006.01) |
| B65G 47/57 | (2006.01) |
| B65G 47/71 | (2006.01) |

(52) U.S. Cl.
CPC ............... *B65G 47/82* (2013.01); *B65G 47/57* (2013.01); *B65G 47/71* (2013.01)

(58) Field of Classification Search
CPC ......... B65G 47/82; B65G 47/71; B65G 47/57
USPC ............ 198/367, 370.07, 435, 440, 441, 442, 198/418.4, 370.08; 271/303
See application file for complete search history.

(56) References Cited

U.S. PATENT DOCUMENTS

| 2,375,241 | A | * | 5/1945 | Lindgren | B65H 33/14 271/218 |
| 3,391,777 | A | * | 7/1968 | Joa | A41H 43/02 198/418.4 |
| 3,472,506 | A | | 10/1969 | Rabinow et al. | |
| 4,666,146 | A | * | 5/1987 | Richter | B65H 29/60 271/178 |
| 5,341,913 | A | * | 8/1994 | Francioni | B65G 57/32 198/418.4 |
| 6,158,736 | A | * | 12/2000 | Bergeron | B65H 29/12 271/303 |
| 6,338,484 | B1 | * | 1/2002 | Puranen | B07C 5/14 271/303 |
| 6,394,445 | B1 | | 5/2002 | d'Agrella et al. | |
| 8,919,530 | B2 | * | 12/2014 | Schreiber | B65G 47/71 198/367 |
| 2010/0272553 | A1 | | 10/2010 | Aschenbeck | |

FOREIGN PATENT DOCUMENTS

EP    0 054 963 B1    5/1985

\* cited by examiner

*Primary Examiner* — William R Harp
(74) *Attorney, Agent, or Firm* — Womble Carlyle Sandridge & Rice LLP

(57) ABSTRACT

A servo rotary shingle diverter includes toothed diverter discs disposed along the path of a stream of shingles separated by spaces. In a first or home rotary position, the diverter discs are disposed entirely beneath the shingle path so that shingles pass the diverter discs unimpeded to a first destination. The diverter discs are rotated at the same rate as the moving shingles such that a tooth of the discs moves along with the shingles and into the path of a selected shingle within the gap head of the selected shingle. The discs are stopped when their teeth align to define a ramp and the next selected shingle engages and rides up the ramp and is diverted thereby to a second destination. The diverter discs are then rotated back to their home position. Every other shingle is thus diverted to the second destination while remaining shingles move on to the first destination.

16 Claims, 2 Drawing Sheets

SERVO ROTARY SHINGLE DIVERTER AND METHOD

REFERENCE TO RELATED APPLICATION

Priority is hereby claimed to the filing date of U.S. provisional patent application 61/922,189 entitled Servo Rotary Shingle Diverter and Method, which was filed on Dec. 31, 2013. The entire content of this provisional patent application is hereby incorporated by reference.

TECHNICAL FIELD

This disclosure relates generally to shingle manufacturing and more specifically to diverting individual cut shingles in a moving stream of shingles to separate infeed conveyors of corresponding auto-catchers for stacking.

BACKGROUND

The process of manufacturing roofing shingles involves pulling a web though a production line and applying raw materials such as asphalt and granule to the web. The width of the web allows for the production of multiple lanes of shingles simultaneously. Once the raw materials have been applied to the web, the web is sliced, sometimes overlaid to form architectural shingles, and cut to produce individual shingles. The final cutting operation typically occurs at a "chop cutter," which cuts moving ribbons of shingle stock transversely across their width to form the individual shingles. These individual shingles may leave the chop cutters in rapidly moving streams of individual shingles, which can be configured in pairs that usually are oriented in back-to-back relationship.

In the past, a stream of individual shingles would leave the chop cutters and be transported from the chop cutters by infeed conveyor to a downstream auto-catcher. The function of the auto-catcher is to catch the shingles in the moving stream in such a way that the shingles are stacked in bundles in the auto-catchers. When a predetermined number of individual shingles have been collected into a bundle in the auto-catcher, the bundle is released onto another series of conveyors that transport the bundle to one or more wrappers, which wrap the bundles for shipment.

As shingle production rates progressively increased, traditional auto-catchers became a bottleneck in the shingle production process due, among other things, to the limited capability of the auto-catcher. More specifically, a single auto-catcher was not capable of catching and releasing reliably all the shingles produced at such higher production rates. A solution was to install a second auto-catcher in-line with the first original auto-catcher and a diverter configured to divert each shingle alternately to separate infeed conveyors of the first or the second auto catcher. The diverters allowed the shingles to be fed to both auto-catchers such that each auto-catcher only needed to operate at half the speed of a single auto-catcher.

One common shingle diverter known as an "up-down" or "wig-wag" converter, includes a set of fingers along the path of the moving stream of shingles that can be moved rapidly by a servo motor between a lowered position and a raised position. In the lowered position of the diverter, a shingle of the moving stream passes over the diverter and continues along a first path to the infeed conveyor of a first auto-catcher. In the raised position of the diverter, its fingers define a ramp up which an approaching shingle rides toward a second infeed conveyor that carries the shingle to the second auto-catcher. In some manufacturing plants, shingles may be diverted down to the second infeed conveyor rather than up.

FIG. 1 illustrates a prior art wig-wag diverter in simplified schematic fort to illustrate the just described operation. Here, a wig-wag diverter 19 is positioned near the end of a main infeed conveyor 12 and just upstream of a first path infeed conveyor 13 and a second path infeed conveyor 14. The diverter 19 includes diverter fingers between the conveyor belts that can be rapidly moved by a servo between a lowered position 21 and a raised position 22. As a shingle 17 approaches the diverter 19 when the diverter is in its lowered position 21 the shingle moves over and past the diverter onto the first catcher infeed conveyor 13 as indicated at 16. This conveyor carries the shingle to a first auto-catcher (not shown). Alternately, as a shingle 17 approaches the diverter when the diverter is in its raised position 22, the shingle rides up the ramp defined by the diverter fingers and is directed onto a second catcher infeed conveyor 14. This second conveyor carries the shingle to a second auto-catcher (not shown). The diverter fingers are raised and lowered between successive shingles so that shingles are directed in alternating sequence to the first and to the second auto-catcher.

Typically, shingles leave the chop cutters in end-to-end relationship with no space between individual shingles. In order to create spacing between successive shingles sufficient to allow the diverter fingers to move to their raised position between shingles, the shingles are accelerated as they leave the chop cutter by the belts of the diverter infeed conveyor. For a typical diverter with 7 inch fingers, a chop cutter or production speed of 800 feet per minute (fpm), and shingles that are 39.375 inches long for example, about 15 inches of space is required between successive shingles. This requires that the diverter infeed belts be driven at about 1105 fpm [(15"+39.375")/39.375"=1.38 percent speed increase. 1.38× 800 fpm=1105 fpm.] As production speeds increase even higher, the shingles must be accelerated to even higher speeds in a shorted period of time before encountering the diverter to increase the spacing between shingles. This, in turn, can have an increasingly adverse impact on other areas of the machine for at least the following primary reasons.

(1) Slip—as a shingle is accelerated by the diverter infeed conveyor in a shorter period of time between the cutter and the diverter, the amount of slip between the shingle and the conveyor belts increases and inconsistency in shingle spacing results. This is due, among other reasons, to factors such as the distance available to accelerate each shingle and the limited friction between the belts and the shingles. There is therefore a practical limit to the speed to which the shingles can be accelerated in a controlled manner in a given distance or time. This, in turn, limits cutter speed and thus production speed.

(2) Deceleration—while the shingles must be accelerated by the diverter infeed conveyor to create spacing for diverting, they likewise must be decelerated by the catcher infeed conveyors before moving into the auto-catchers. This is because it is nearly impossible to catch shingles traveling at extremely high speeds. As a shingle moves into the auto-catcher it must come to a complete stop. Shingle are not rigid enough to enter the auto-catcher at a high rate of speed and stop instantaneously without deforming. The requirement to decelerate the shingles after they are accelerated through the diverter gives rise to the same slip and inconsistency issues encountered during acceleration, and therefor represents a limitation processing speed. These limiting issues are usually most prominent for the most upstream auto-catcher because the shingles must be decelerated in a shorter distance for this auto catcher.

(3) Diverting a shingle from a horizontal path to an upwardly angled path at higher speeds can cause the shingle to "fly." In other words, the shingle can move so fast that the diverter launches the shingle into air rather than moving it reliably onto a conveyor. The faster the shingles are traveling when they encounter the diverter the less control one has over this phenomenon. This again is a limiting factor that can limit production rates.

The above problems cannot be solved simply by reducing spacing between individual shingles, and thereby reducing required acceleration and deceleration rates. This is because for a traditional wig-wag diverter such as that shown in FIG. 1, the length of the diverter fingers limits the required minimum distance between individual shingles. More specifically, a leading shingle must travel completely past the diverter before the divert fingers can be moved from a lowered position to a raised position. If the fingers begin to lift before the tail of a leading shingle clears the diverter, the fingers will flip the tail of the shingle up and cause a jam. Once the leading shingle passes the diverter, the diverter fingers must cycle completely to their raised positions before the leading edge of the next trailing shingle makes contact with the diverter. If the leading edge of the next shingle is on the diverter while it is still moving to its raised position, the shingle will be flipped or launched into the air by the rapidly moving diverter fingers and likely cause a jam. These constraints coupled with the cycle time of the programmable logic controller (PLC), distance moved by the shingles per PLC cycle, photo eye delays, speeds at which information can be passed to the input card of the controller, and the time it takes the servo motor to move the diverter fingers from their lowered position to their raised position dictates the required minimum spacing between shingles. For a machine with traditional 7" long diverter fingers and shingles moving at 1105 fpm, this minimum spacing is about 15". Reducing the spacing below this minimum is not possible for a given machine with a traditional wig-wag diverter.

A method and apparatus re therefore needed for significantly reducing the required minimum spacing between shingles as they move through a diverter in order to reduce acceleration and deceleration rates of the shingles for a given machine production speed. Alternatively, such method and apparatus should allow production speeds to be increased while not taxing the limitations of the diverter and auto-catchers. It is to the provision of such a method and apparatus that the present disclosure is primarily directed.

SUMMARY

Briefly described, a rotary diverter comprises toothed rotary diverter discs disposed below and between the belts of a diverter infeed conveyor. The diverter discs are mounted on a shaft that can be rotated in a controlled manner by a servo motor. In a first rotary position of the diverter discs, the teeth of the discs lie completely below the diverter infeed conveyor belts. In this position, a shingle being conveyed by the belts pass over the diverter and move to an infeed conveyor of a first auto-catcher. In a second rotary position of the diverter discs, a tooth of each disc extends upwardly between the belts at a predetermined angle. The teeth thus form a ramp up which a shingle rides toward the infeed conveyor of a second auto-catcher. Indexing the diverter discs between successive shingles alternately diverts shingles either to the infeed conveyor of the first auto-catcher or to the infeed conveyor of the second auto-catcher. In the preferred embodiment, the diverter discs are rotated at a rate that matches the rate at which shingles are conveyed by the diverter infeed conveyor.

The rotary diverter described above reduces dramatically the minimum required spacing between successive shingles. This is due, among other things, to the fact that the diverter fingers can begin their indexed rotation before a leading shingle destined for the first auto-catcher passes over the diverter. The rising teeth of the diverter discs simply follow closely behind the trailing edge of the leading shingle. Further, the next trailing shingle can engage the rising teeth of the diverter discs before they complete their rotary movement to the second rotary position. This is because the teeth are rotating at the same rate that the shingle is moving so that the shingle does not get flipped into the air by the rising diverter teeth.

It has been found that the rotary diverter of this disclosure can reduce the required minimum spacing between shingles by half or more. This, in turn, likewise reduces the acceleration rates required to obtain the spacing and reduces the deceleration rates required upstream of the auto-catchers. Accordingly, the diverter operate with greater control at a given line speed or, perhaps more importantly, can operate at higher line speeds and still maintain control of the shingles during acceleration, deceleration, and diversion.

These an other features, aspects, and advantages of the invention will be better understood upon review of the detailed description set forth below when taken in conjunction with the accompanying drawing figures, which are briefly described follows.

DETAILED DESCRIPTION

Figure 1:
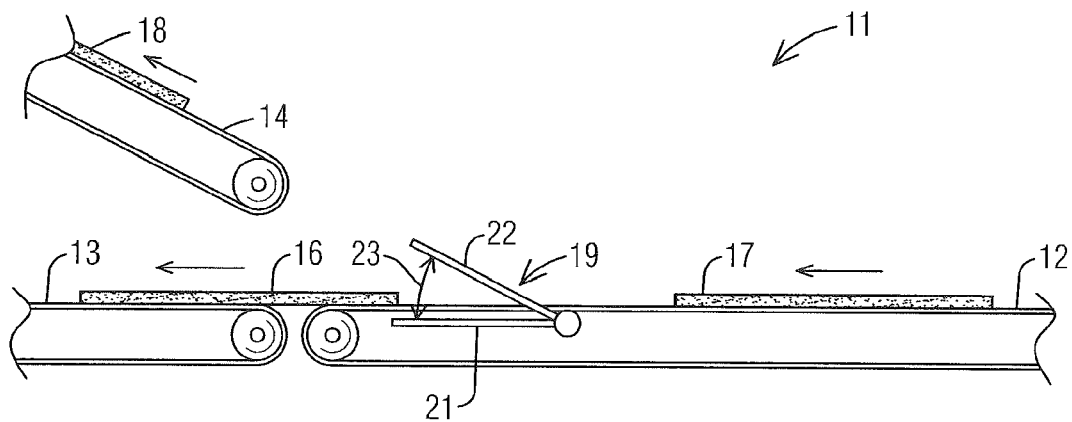
FIG. 1 (referenced above) illustrates in simplified schematic form a typical prior art "wig-wag" diverter for diverting shingles.

Reference will now be made in more detail to dr wing FIGS. 2 through 4, wherein like reference numerals indicate like parts throughout the several views. These figures show, in simplified schematic form, a rotary diverter and associated conveyors. The diverter and conveyors are seen from the side. The skilled artisan will understand that the conveyors typically are defined by a plurality of conveyor belts that are spaced apart from each other. Further, while the diverter itself is seen in profile in the figures, the skilled artisan will appreciate that the diverter preferably comprises an array of diverter discs spaced apart along a drive shaft. Each of the diverter discs is vertically aligned between a pair of the conveyor belts so that the teeth of the diverter discs are raised and lowered between diverter belts as the diverter discs are rotated.

Figure 2:
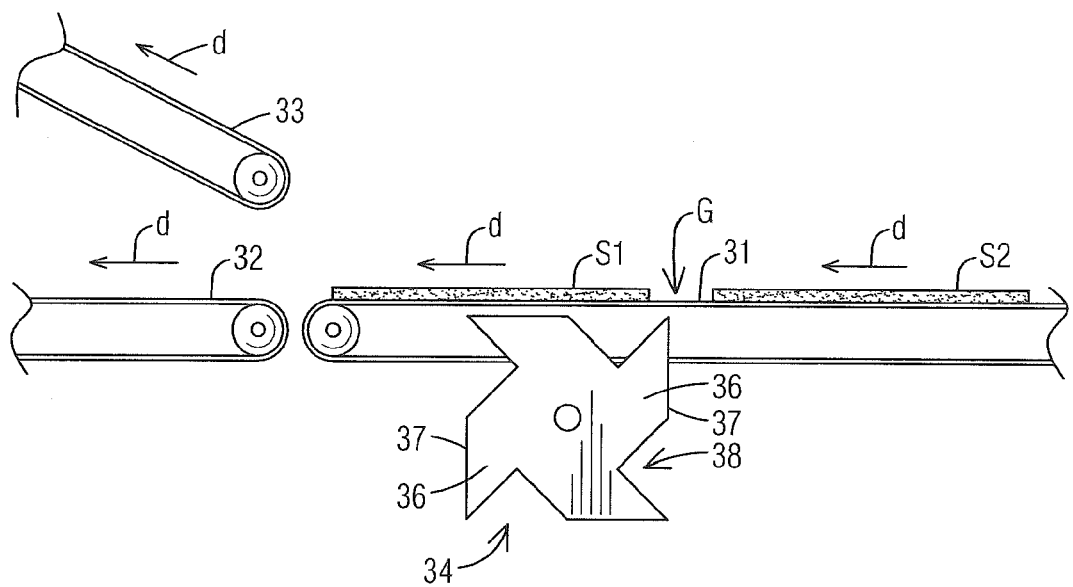
FIG. 2 shows, again in simplified schematic form, a servo rotary diverter according to principles of the invention with the diverter in its non-diverting rotary position allowing a shingle to move onto a first infect conveyor.

FIG. 2 shows a diverter infeed conveyor 31 conveying shingles S1 and S2 in downstream direction d toward servo rotary diverter 34. To the left of servo rotary diverter 34 are two auto-catcher infeed conveyors 31 and 32, which convey shingles to respective auto-catchers (not shown). The shingles S1 and S2 have been accelerated by the diverter infeed conveyor to obtain a gap G between successive shingles. The servo rotary diverter 34 comprises a number discs (only one of which is visible in FIG. 2) that are spaced between the belts of the diverter infeed conveyor 31. Each diverter disc is formed with four teeth 36, each of which defines a land 37 with the teeth being separated by gaps 38. The diverter discs are rotatably mounted on a central shaft and can be controllably rotated by a servo motor and PLC in a counterclockwise direction in FIG. 2.

In FIG. 2, the rotary diverter is shown in its home position in which the entirety of each diverter disc is positioned below the upper flight of the diverter infeed conveyor. In this position, shingle S1 is seen to be passing over the diverter unimpeded so that shingle S1 is conveyed straight ahead to the first auto-catcher infeed conveyor 32. The trailing edge of shingle S1 has just passed the tips of the rightmost teeth of the diverter discs. At this point, the PLC is programmed to direct the servo motor to begin to rotate the diverter discs in the counterclockwise direction. Furthermore, the rotation rate of the diverter discs is set such that the teeth 36 of the discs rotate around at a predetermined speed. In one embodiment, this predetermined speed is the wale speed as the speed at which the shingle are being conveyed by the diverter infeed conveyor 31. As the discs rotate, the tips of their rightmost teeth 36 begin to move upwardly between the conveyor belts into the path of the shingles S1 and S2. However, since the teeth of the discs are rotated at the same speed as the shingles are moving, the tips of teeth 36 follow closely behind the trailing edge of shingle S1 during their rotation.

Figure 3:
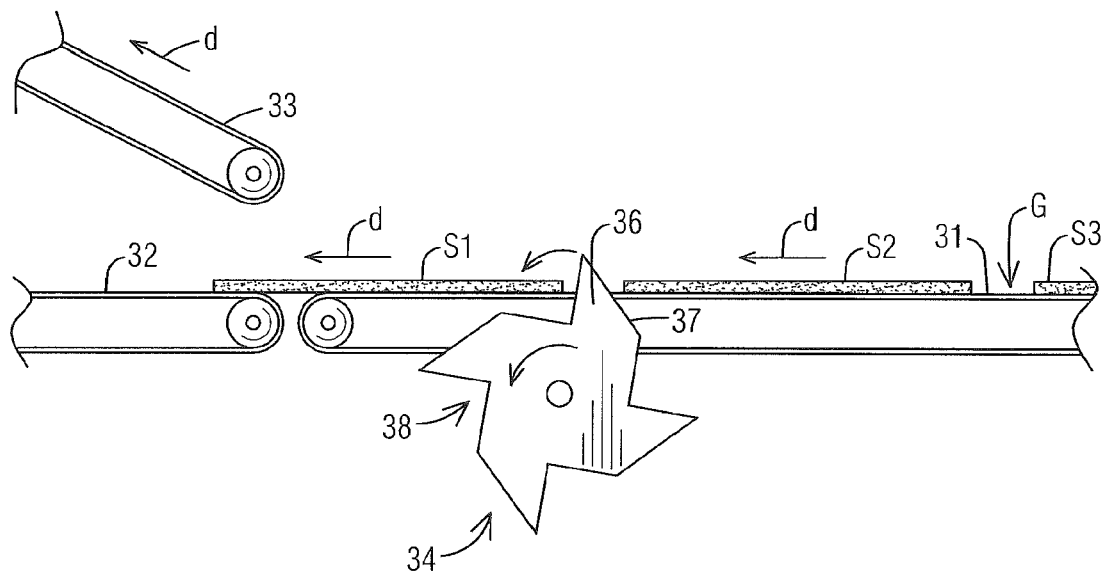
FIG. 3 shows the servo rotary diverter of FIG. 2 with the diverter moving to its diverting rotary position within the gap between shingles.

FIG. 3 shows the rotary diverter during its rotation from the home position toward raised position in which it functions as a shingle diverter. The shingle S1 has moved further downstream and the teeth 36 of the rotating diverter discs are following closely behind the trailing edge of shingle S1. Similarly, as the teeth are rotated at the speed of the singles S1 and S2, they maintain their position just ahead, of the leading edge of the next shingle S2. Thus, the teeth move into the path of the shingles within the gap G between shingles. In this way, the shingles re not disturbed by the rising teeth of the diverter between them.

Figure 4:
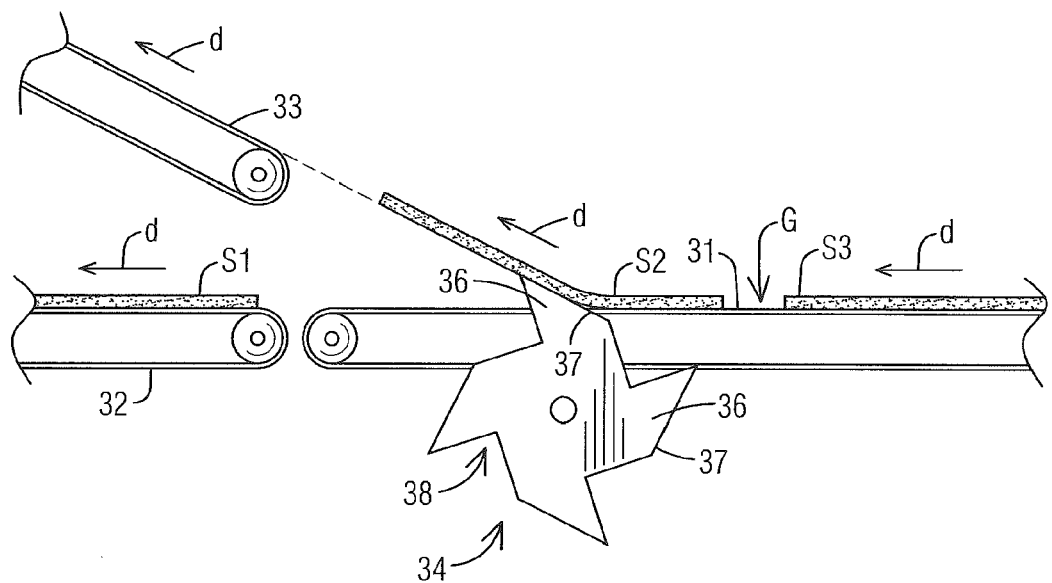
FIG. 4 shows the servo rotary diverter of FIG. 2 with the diverter in its second or diverting rotary position diverting a shingle to a second infeed conveyor.

In FIG. 4, the diverter discs have been rotated through a predetermined angle by the servo motor and have been stopped. In this position, the lands 37 of the divert discs align to define a ramp in the path of the shingles. In the illustration of FIG. 4, shingle S1 has moved further downstream and onto the first auto-catcher infeed conveyor 32 to be conveyed to the first auto-catcher. Shingle S2, on the other hand, has engaged the ramp defined by the lands 37 of the diverter discs and is being diverted up the ramp toward the second auto-catcher conveyor 33. When the trailing edge of shingle S2 clears the ramp, the PLC commands the servo motor to rotate the diverter discs back to the position shown in FIG. 2, again preferably at the same rate as the moving shingles. The gap G between the shingle S2 and the next trailing shingle S3 ensures that the shingle S3 does not engage the diverter discs as they are rotated back to the home position because the teeth of the discs again move within the gap G. Thus shingle S3 passes over the diverter 34 as did shingle S1 in FIG. 2 and is conveyed straight ahead onto the first auto-catcher infeed conveyor 32. The cycle then repeats. The diverter discs may be rotated as described so that their teeth rotate up between every other shingle thereby diverting every other shingle to the second auto-catch conveyor 33. In such a scenario, half of the shingles are directed to the first auto catcher (not shown) and the other half are directed to the second auto catcher.

The servo rotary diverter of this invention allows for the gap G between successive shingles of the moving stream of shingles to be substantially narrower than with traditional wig-wag type diverters. This is primarily because there is no longer the need for a leading shingle to clear the diverter before it is cycled up as in traditional wig-wag diverters. The rotary diverter discs begin their cycle before the trailing edge of a leading shingle clears the diverter and the teeth of the discs move within the gap between moving shingles. Once the trailing edge of a shingle passes the tip of the upstream tooth of the diverter discs, the discs begin their cycle toward their second or diverting position. The waiting time for the shingle to clear the wig-wag fingers is almost entirely eliminated. As an example, for a typical 7" wig-wag finger, this amounts to a decrease in shingle gap width of about 7" and a corresponding reduction in waiting time of about 0.0315 seconds.

The reduction in gap width between shingles and the reduction in waiting time allows for a higher infeed speed for a given diverting speed, say 1105 fpm in the example given above. In fact, for the example given above, the line speed at the chop cutter can be increased from 800 fpm to around 920 fpm without increasing the diverter infeed speed or the acceleration necessary to obtain the speed. [(8+39.25)/39.25=1.2 and 1105 fpm/1.2=920 fpm]. Thus, line speeds and production rates can be increased without taxing the limits and ability of the infeed belts to accelerate and decelerate the shingles. Alternatively, for a give line speed, infeed speed can be reduced providing greater control over the acceleration and deceleration process and the diversion of shingles.

A servo motor with an absolute resolver is preferred for driving the diverter discs to allow for a one-time home procedure upon installation of a new servo motor. On replacement, the diverter discs are manually rotated to the home position shown in FIG. 2 and the resolver position is zeroed out. The position unwind preferably is to 90° so that if the diverter is powered down or experiences a fault, it automatically moves to its home position on restart. It is then commanded to a predetermined angle, e.g. 23 degrees, after the current shingle passes the trailing tip of diverter disc's teeth for diverting the next shingle to the upper auto-catcher infeed conveyor. Once this shingle is diverted, the servo motor commanded to rotate through an angle that is complementary to the first predetermined angle, e.g. 67°, back to a home position. The PLC thus controls the servo motor at 90° intervals four times for a complete 360° rotation of the diverter discs.

Preferably, the acceleration and deceleration of the diverter rotation is set to max and the speed of rotation varies with the speed of the shingles so that as line speed is increased, the diverter rotation rate is, matched to the shingle speed. Should an auto-catcher jam occur, the PLC is programmed to control the diverter in such a way that the diverter will continue to direct shingles to both auto-catchers until line speed drops to the appropriate set point to allow a single auto-catcher to handle the throughput. Once the line speed reaches this set point, the diverter position is fixed to deliver shingles to the still functioning auto-catcher until the jam is cleared or the other auto-catcher is repaired. Upon restart of the jammed auto-catcher and when the conveyor belts are back to speed, the diverter begins to divert again and the line speed increases to normal.

In conclusion, the servo rotary diverter of this invention and the method of diverting shingles enabled thereby allow increased production line speed while maintaining conveyor speeds between the chop utters and the auto-catchers at levels that allow consistent and reliable operation of the auto-catchers.

The invention has been described herein in terms of preferred embodiments and methodologies considered by the inventor to represent the best modes of carrying out the invention. It will be understood by the killed artisan, however, that a wide range of additions, deletions, and modifications, both subtle and gross, might be made to the illustrative embodiments without departing from the spirit and scope of the invention embodied thereby.

What is claimed is:

1. A shingle diverter for diverting spaced apart shingles moving along an infeed conveyor selectively to a first auto-catcher infeed conveyor or a second auto-catcher infeed conveyor, the shingle diverter comprising:
   at least one diverter disc mounted for rotation about an axis of rotation beneath the infeed conveyor, the at least one diverter disc having at least one tooth projecting radially away from the axis of rotation and being configured to define at least one peripheral ramp extending at a predetermined angle from a first end located at a first radius of the diverter disc to a second end located at a second radius of the diverter disc, the second radius being greater than the first radius;
   the at least one diverter disc being selectively rotatable between a first rotary position wherein the at least one diverter disc is below the infeed conveyor and a second rotary position wherein the at least one peripheral ramp extends above and at an angle away from the infeed conveyor toward the second auto-catcher conveyor and is located in the path of shingles moving along the infeed conveyor
   the at least one diverter disc in its first rotary position allowing a shingle moving along the infeed conveyor to continue past the diverter toward the first auto-catcher infeed conveyor;
   the at least one diverter disc in its second rotary position diverting a shingle moving along the infeed conveyor away from the infeed conveyor toward the second auto-catcher conveyor;
   a motor operatively coupled to the at least one diverter disc and being controllable to rotate the at least one diverter disc from its first rotary position to its second rotary position and then to discontinue rotation of the diverter disc;
   a controller coupled to the motor, the controller activating the motor to rotate the at least one diverter disc to its second rotary position to move the tooth and its ramp in the path of selected ones of the shingles with the at least one tooth moving within the spaces between the shingles and then discontinuing rotation of the diverter disc as a shingle is diverted by the ramp.

2. A shingle diverter as claimed in claim 1 wherein the infeed conveyor comprises a plurality of conveyor belts arranged in spaced relationship.

3. A shingle diverter as claimed in claim 2 wherein the at least one diverter disc is vertically aligned between two of the conveyor belts so that the peripheral ramp moves into the path of selected shingles through the space between the conveyor belts.

4. A shingle diverter as claimed in claim 3 wherein the at least one diverter disc comprises a plurality of diverter discs vertically aligned between respective pairs of the conveyor belts.

5. A shingle diverter as claimed in claim 4 wherein the diverter discs are mounted on a drive shaft.

6. A shingle diverter as claimed in claim 5 wherein the motor is coupled to rotate the drive shaft and thereby rotate the diverter discs simultaneously.

7. A shingle diverter as claimed in claim 1 wherein the at least one tooth comprises a plurality of teeth each defining a peripheral ramp.

8. A shingle diverter as claimed in claim 7 wherein the plurality of teeth comprises four teeth.

9. A shingle diverter as claimed in claim 1 wherein the motor comprises a servo motor.

10. A shingle diverter as claimed in claim 9 wherein the controller comprises a PLC.

11. A method of directing shingles moving in spaced apart relationship along a first path selectively to a second path or a third path, the method comprising the steps of:
   (a) moving a ramp in the direction of movement of the shingles along the first path:
   (b) during step (a), raising the ramp through a space between a leading shingle and a trailing shingle on the first path;
   (c) ceasing movement of the ramp when the ramp is positioned to direct the trailing shingle toward the third path;
   (d) allowing the trailing shingle to engage the ramp and be diverted by the ramp toward the third path;
   (e) moving the ramp in the direction of movement of shingles along the first path;
   (f) during step (e), lowering the ramp through a space between successive shingles until the ramp is located out of the path of shingles on the first path; and
   (g) allowing at least one successive shingle to pass the lowered ramp and be conveyed toward the second path.

12. The method of claim 11 wherein the ramp is defined on the periphery of a diverter disc located beneath the first path and wherein steps (a) and (b) comprise rotating the diverter disc.

13. The method of claim 12 wherein steps (e) and (f) comprising rotating the diverter disc.

14. The method of claim 11 wherein steps (a) through (g) are repeated for each shingle moving along the primary path such that every other shingle is directed toward the third path and every other shingle is directed toward the second path.

15. The method of claim 11 wherein the shingles are moved along the first path by a conveyor comprising spaced apart conveyor bands and wherein step (b) comprises raising the ramp within a space between spaced apart conveyor bands.

16. The method of claim 15 wherein step (f) comprises lowering the ramp within a space between spaced apart conveyor bands.

* * * * *